United States Patent Office 2,810,762
Patented Oct. 22, 1957

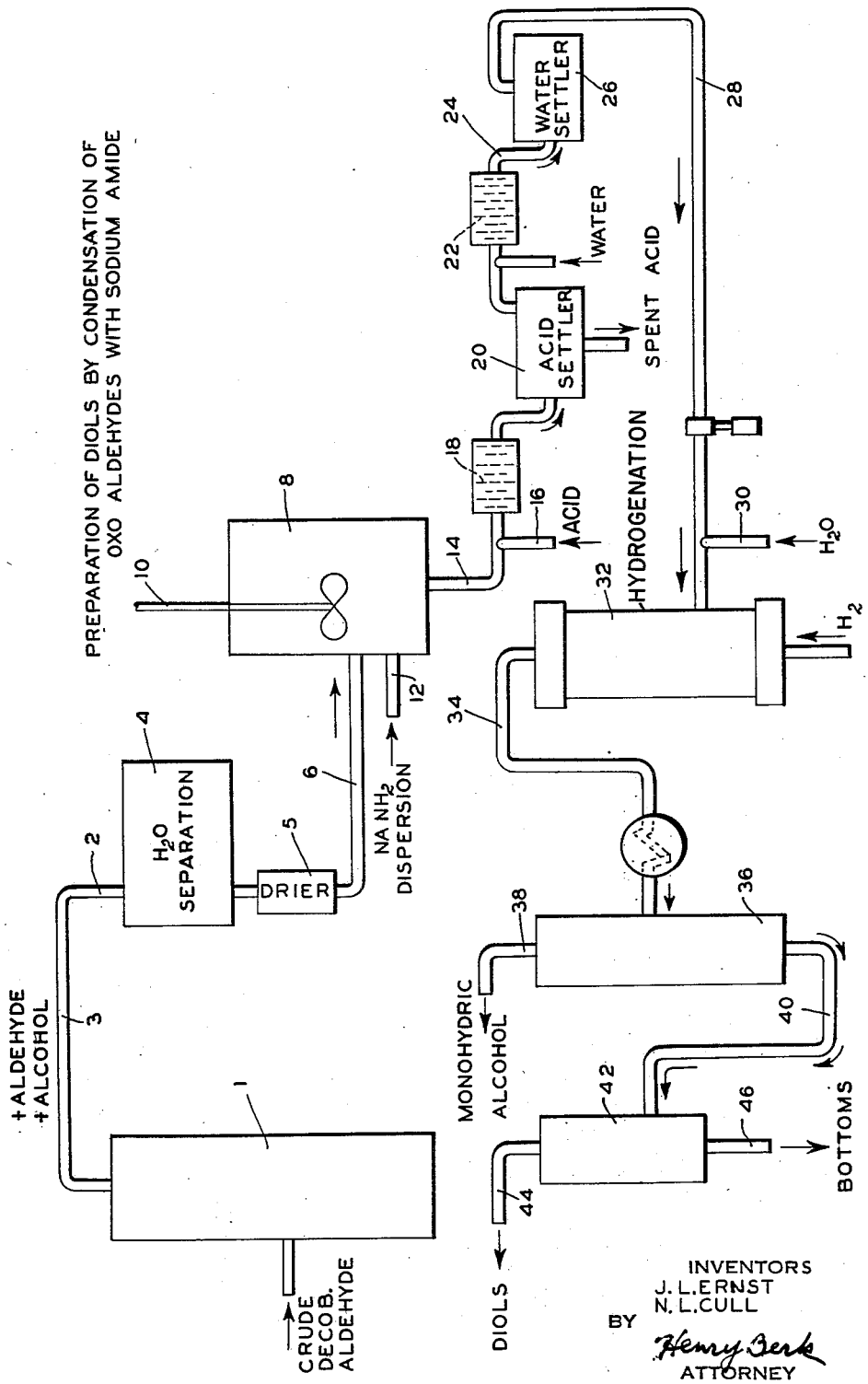

2,810,762

ALDOLIZATION BY SODAMIDE AND HYDROGENATION OF PRODUCT

John L. Ernst, Baton Rouge, and Neville L. Cull, Baker, La., assignors to Esso Research and Engineering Company, a corporation of Delaware Application December 30, 1953, Serial No. 401,242

8 Claims. (Cl. 260—602)

The present invention relates to the preparation of oxygenated compounds by the reaction of carbon monoxide and hydrogen with olefinic hydrocarbons in the presence of a carbonylation catalyst. More specifically, the present invention relates to the preparation of glycols and dimeric monoalcohols from the aldehyde product formed in the first stage of the carbonylation reaction. In its broadest aspects, the present invention relates to a novel process for preparing glycols and dimeric monoalcohols from aldehydes, particularly when these are contaminated with minor amounts of corresponding alcohols and other impurities.

The carbonylation, or aldehyde synthesis reaction is now well known in the art, and provides a ready means for preparing aldehydes and alcohols from compounds containing olefinic unsaturation. In accordance with that reaction, olefins, $H_2$ and CO are reacted in the presence of a carbonylation catalyst, such as cobalt carbonyl, which in turn may be derived from any form of cobalt. Carbonylation reaction conditions include temperatures of from about 200°–400° F. and pressures of from about 1500–4500 p. s. i. g. Under these conditions, one mole of hydrogen and one mole of CO add to the olefinic linkage to produce a mole of an aldehyde having one more carbon atom than the corresponding olefin. A large number of secondary reactions also take place in this carbonylation zone. Synthesis gas is usually added in considerable excess, and a substantial hydrogenation of aldehydes to alcohols occurs. When the final product desired is the alcohol, this presents no particular problem.

The first-stage product also contains a certain amount of acetals, formed by interaction of the aldehydes and alcohols, and esters resulting from Cannizzaro reaction. Formic esters also are present; these may result from formic acid produced by interaction of $H_2$ and CO in the presence of a cobalt catalyst. The aldehyde product also contains in solution large amounts of cobalt hydrocarbonyl, the active catalyst for the reaction, which is synthesized in situ from whatever form of cobalt is added to the reactor. This hydrocarbonyl is generally removed by thermal treatment of the aldehyde product in the presence of a gas, vapor, hot water, or dilute acid.

The aldehyde synthesis process briefly described above affords a ready means of preparing aldehydes from a wide variety of olefins, for most olefins, if they are not too highly branched, may be subjected to this reaction, with yields depending upon steric factors.

It is well known that low molecular weight aldehydes, when pure, can be condensed with alkaline catalysts, such as NaOH, KOH, $Na_2CO_3$ and the like, in aqueous or alcoholic solution, to produce aldols. The aldolization reaction may be regarded as the condensation of two molecules of an aldehyde with the formation of a hydroxyaldehyde. The lower aldols in particular are readily dehydrated to the corresponding unsaturated aldehyde which on reduction forms the saturated alcohol. The hydroxy aldehydes may also be converted by hydrogenation to the corresponding glycols. The latter type products are particularly valuable because of their versatility in chemical reactions and as intermediates in the preparation of plasticizers, lubricants and insecticides.

Serious difficulties have been experienced when it was attempted to subject the aldehydes resulting from the carbonylation reaction to the aldol process. A non-aqueous medium was required, particularly for the higher molecular weight aldehydes, and the customary aldolizing agents, even such an active one as alcoholic KOH, was found to yield only relatively small amounts of an aldol condensation product, except when employed in very large amounts. This may be associated with the complex mixture that results from the first stage carbonylation reactor, for the same catalyst reacting with relatively pure (90%) aldehyde is found to be quite active in forming the condensate.

It is therefore the principal object of the present invention to set forth a process for converting aldehydes, particularly those prepared by the aldehyde synthesis reaction from olefins, into oxygenated compounds having twice the number of carbon atoms than the parent aldehyde.

It is also a purpose of the present invention to set forth a process for preparing aldol condensation products in high yields from mixtures of aldehydes and alcohols.

It is a still further purpose of the present invention to set forth a process for preparing glycols in good yields from aldehydes and aldehyde mixtures.

Other and further objects and advantages of the present invention will become clear hereinafter.

It has now been found that a particularly active catalyst for converting aldehydes to dimeric alcohols and glycols is sodamide. It has further been found that this catalyst is particularly selective to the formation of the dihydric alcohols, which have proven themselves useful as synthetic lubricant intermediates and plasticizers. Not only has sodamide been found to be active in aldolizing relatively pure aldehydes, but also it possesses the distinct advantage, not shown by other aldolizing catalysts, of being able to aldolize the decobalted aldehyde product. This material may contain only 30%–50% aldehyde, the balance being alcohols, esters, acetals and the like. Purification of this mixture is costly, for on distillation aldehyde product generally is lost to some extent to polymer.

In accordance with the invention, therefore, aldehyde product is treated with sodamide at a temperature of about 100° to 250° F. for a period of 1 to 4 hours. The treated product may be given a caustic treatment to hydrolize esters, if desired, and thereafter hydrogenated, and fractions containing high yields of both the dimeric monohydric and the dimeric dihydric alcohols are recovered.

The present invention and its application will best be understood from the more detailed description hereinafter, wherein reference will be had to the accompanying drawing, which is a schematic representation of a system suitable for carrying out a preferred embodiment of the invention.

Referring now to the drawing, crude aldehyde from a decobalting unit (not shown), which may contain about 30%–50% aldehyde, 5%–20% alcohol, the balance being other impurities such as esters and acetals, is passed through line 2 to water separator 4, where, by settling or other conventional means, a substantially dry product is produced. It is to be understood that the aldehydes may be derived from other sources than from the aldehyde synthesis reaction from olefins, and that substantially purer aldehydes may be employed. However, the invention realizes its highest utility when the source and characteristics of the aldehyde product is as described above.

The dried aldehyde product is passed to reaction vessel 8 via line 6. Vessel 8 is preferable equipped with means of agitation 10 and means for temperature control. A dispersion or slurry of sodamide in an organic medium, preferably the aldehyde product, is introduced into reactor 8 via line 12. About 1% to 4% by weight of reagent on aldehyde is thus injected. Temperatures in the range of from about 100° to 250° F. prevail in reactor 8, and a residence time of 1 to 4 hours is suitable. Lower temperatures, in the range of 0 to 150° F., favor the diol formation reaction.

Thereafter reaction product is withdrawn through line 14, water-washed, and the water layer separated. Both the organic and the water layer may thereafter be acidified with 1%–2% HCl or $H_2SO_4$ in mixer 18. Acidification separates organic acids formed in the aldolization step and these may be recovered by known processes. The mixture is thereafter passed to acid settler 20, spent acid withdrawn, and the condensation product water-washed in mixer 22 and separated from wash water in settler 26. The crude condensation product is then pumped via line 28 to hydrogenation vessel 32, wherein the presence of any conventional hydrogenation catalyst, such as nickel, cobalt, copper chromite, sulfactive catalysts such as supported or unsupported oxides or sulfides of molybdenum, tungsten and the like, conversion to mono and dihydric dimeric alcohols is completed. Reaction conditions include temperatures of 300°–550° F. and pressures up to 3500–4500 p. s. i. g. Water may be added through line 30 to increase alcohol selectivity.

The crude product is passed through line 34 to alcohol still 36, wherein monohydric alcohols are withdrawn overhead. These include any alcohol product formed during the hydrogenation from aldehyde that did not condense in reactor 8, as well, of course, the dimeric monohydric alcohol resulting from the dehydration and hydrogenation of the aldol. Bottoms product is withdrawn from 36 via line 40 and passed to still 42. This bottoms product comprises the glycol formed by the hydrogenation of the hydroxyaldehydes produced in reactor 8. They may be recovered by distillation, preferably at reduced pressures, from still 42.

The present invention may be further illustrated by the following specific examples, which set forth not only the effectiveness of this catalyst but also its superiority over conventional catalysts, particularly in the aldolization of crude aldehydes prepared by the carbonylation of olefins.

EXAMPLE I 730 grams of 98% purity iso-octyl aldehyde dried over anhydrous $Na_2CO_3$ were placed in a 2-liter flask equipped with stirrer and blanketed with nitrogen. Four weight percent sodamide catalyst was ground up and added slowly, the temperature being maintained at 200–220° F. for 2 hours. Thereafter, the reaction products were cooled with stirring. Then 500 cc. of water were added after the mixture had cooled to 80° F. The product was successively washed with $H_2SO_4$, followed by two water washes, and then hydrogenated over a reduced nickel catalyst. The product (510 grams) was then distilled at 20 mm. pressure.

Distillation data (acid-free basis):
   Initial—225° F. ($C_8$ alcohol) _____grams__ 129
   Intermed.:
     225°–330° _____do____ 8
     330°–360° ($C_{16}$ alcohol) _____do____ 137
     360°–540° ($C_{16}$ diol) _____do____ 158
   Bottoms _____do____ 49
Conversion (wt. percent)_____ 75
Selectivity to $C_{16}$ alcohol_____percent__ 36
Selectivity to $C_{16}$ diol_____do____ 41

These data show not only the high conversions obtained by the use of the sodamide catalyst, but also the high selectivity to the glycol.

EXAMPLE II

In this example, the effectiveness of the sodamide catalyst is compared with that of alcoholic KOH. For the purpose of this comparison, an isooctyl aldehyde product of 95% purity is employed. It will be observed that the sodamide catalyst is substantially more selective to the formation of the dihydric dimeric alcohol than is the KOH, while as far as aldehyde conversion is concerned, equally good results were obtained using either sodamide (2%) or alcoholic KOH (5%).

| Catalyst | $NaNH_2$ | Alcoholic KOH | |
|---|---|---|---|
| Catalyst Conc. Wt. Percent | 2 | 5 | 5 |
| Feed | 95+ Percent $C_8$ Aldehyde | | |
| Reaction Conditions: | | | |
| Temperature, °F | 220 | 180–190 | 180–190 |
| Time, Hrs | 2 | 2 | 4 |
| Saponification Treat | 10% Alc. KOH 1 Hr. @ 220° F. | None | None |
| Distillation Data (20 mm. Hg):[1] | | | |
| Initial—225° F. ($C_8$ Alcohol) | 16.4 | 20.3 | 20.4 |
| 225–330° F. (Intermediate) | .9 | 1.5 | 6.0 |
| Acid Cut (68% $C_8$ Acid) | 17.8 | [2] 7.4 | [2] 6.1 |
| 330–360° F. ($C_{16}$ Alcohol) | 32.5 | 52.7 | 49.3 |
| 360–540° F. Pot ($C_{16}$ Glycol) | 21.0 | 11.0 | 12.1 |
| Bottoms | 6.8 | 5.1 | 4.2 |
| Trap | 4.6 | 1.9 | .8 |

[1] Wt. percent products based on distillation of hydro product. Autoclave hydrogenation with reduced nickel catalyst 6 hrs. @ 350° F., 2600 p. s. i. g. Methanized hydrogen. Hydrocarbon free basis.
[2] Crude acid.

The marked superiority of sodamide over conventional aldolizing catalysts, such as alcoholic KOH, is particularly apparent when, instead of treating a relatively pure aldehyde, decobalted aldehyde product from the carbonylation reaction is subjected to the aldol condensation reaction.

*Aldol condensation of decobalted isooctyl aldehyde*

| Catalyst | $NaNH_2$ | Alcoholic KOH | |
|---|---|---|---|
| Cat. Concent. Wt. Percent | 2.0 | 5.0 | 10.0 |
| Feed | Crude Isooctyl Aldehyde | | |
| Wt. Percent $C_8$ Aldehyde in Feed | 46 | 38 | 38 |
| Temperature, °F | 200–215 | 180–190 | 180–190 |
| Reaction Time, Hrs | 2 | 2 | 2 |
| Wt. Percent Principal Prods.: | | | |
| $C_8$ Alcohol | 43.4 | 70.0 | 44.8 |
| $C_{16}$ Alcohol | 19.5 | 4.6 | 26.9 |
| $C_{16}$ Glycol | 13.6 | 8.1 | 6.3 |
| Bottoms | 13.1 | 8.0 | 11.9 |
| Crude $C_8$ Acid | 2.8 | 4.0 | 10.1 |

The above data show that, in the case of 5% alcoholic KOH, substantially no conversion of aldehyde was obtained, and only when 10% was employed were conversions obtained of the same order as with sodamide (2%). These data are to be compared with Example II, where it was shown that, with relatively pure aldehydes, 5% alcoholic KOH gave conversions of about the same magnitude as 2% $NaNH_2$. Also, KOH gave substantial greater yields of the less valuable $C_8$ acids.

The glycols prepared in accordance with this reaction have formulas of the type $RCH_2CH(OH)CH(R)CH_2OH$ where R represents an alkyl group with from 3 to 10 carbon atoms, and have a wide variety of uses and applications. The $C_{10}$ glycol prepared by aldolizing the $C_5$ aldehyde product resulting from carbonylation of butylenes has insect-repelling properties and, because of its lower volatility, has high persistence and low toxicity characteristics. The glycol boils at 290–320° F. at 20 mm., has an acetyl number of 428±4 (435 theoretical) and has an empirical formula $C_{10}H_{20}(OH)_2$.

The $C_{16}$ glycol as prepared in the preceding examples, has an empirical formula $C_{16}H_{32}(OH)_2$. It was found to have an acetyl value of 328±3 (328 theory) and to boil 380–405 (vapor temp.) or 540 (pot temp.) at 20 mm.

The $C_{20}$ glycol was also prepared in accordance with the present invention, as follows:

1400 ml. (1150 grams) of $C_{10}$ aldehyde (92%) was treated with 21 grams (2 weight percent) of sodamide for 2 hours at 220° F. After cooling, the product was saponified and after working up the product in the manner previously described, the following yields were obtained.

| Wt. Percent Principal Products | Acid-Free Basis | Acid Containing Basis |
|---|---|---|
| | Percent | Percent |
| Crude $C_{10}$ acid | 0 | 23.2 |
| $C_{10}$ alcohol | 22.1 | 17.8 |
| Intermediate | 7.3 | 8.3 |
| $C_{20}$ Alcohol | 37.2 | 28.6 |
| $C_{20}$ Glycol | 17.4 | 13.4 |
| Bottoms | 8.5 | 6.6 |
| Wt. percent conversion | 77.9 | 82.2 |

The $C_{20}$ glycol has a hydroxyl number of 329 and a boiling range (vapor) of 375–385° F. at 5 mm., a 575° pot temperature. The empirical formula is $C_{20}H_{40}(OH)_2$.

What is claimed is:

1. An improved process for aldolizing water-insoluble aldehydes which comprises treating said aldehydes with 1% to 4% by weight of anhydrous sodamide at a temperature of about 100° to 250° F. for about 1 to 4 hours.

2. An improved process for aldolizing aldehyde-comprising mixtures containing about 30% to 50% of aldehydes and 5% to 20% alcohols which comprises treating said mixtures with 1% to 4% by weight of sodamide for about 1 to 4 hours at about 100° to 250° F.

3. In the process wherein olefins having $n$ carbon atoms in the molecule are converted to an oxygenated reaction product comprising aldehydes by reaction with hydrogen, carbon monoxide and a cobalt carbonylation catalyst at elevated temperatures and pressures and said reaction product converted to an alcoholic product, the improvement which comprises treating said aldehyde comprising reaction product with 1% to 4% by weight of sodamide at 100° to 250° F., hydrogenating the treated product, and recovering a product comprising monohydric alcohols having $2n+2$ carbon atoms and dihydric alcohols having $2n+2$ carbon atoms.

4. The process of claim 3 wherein said aldehyde-comprising reaction product treated with sodamide comprises 30% to 50% aldehydes and 5% to 20% alcohols, said aldehyde and said alcohol having $n+1$ carbon atoms.

5. The process of claim 3 wherein said reaction product following said sodamide treatment is hydrolyzed prior to hydrogenation.

6. The process of claim 3 wherein $n$ equals 4.
7. The process of claim 3 wherein $n$ equals 7.
8. The process of claim 3 wherein $n$ equals 9.

References Cited in the file of this patent

UNITED STATES PATENTS

| 2,536,028 | Brothman et al. | Jan. 2, 1951 |
| 2,614,128 | Mertzweiller | Oct. 14, 1952 |
| 2,648,694 | Mason et al. | Aug. 11, 1953 |

FOREIGN PATENTS

| 439,195 | Great Britain | Dec. 2, 1935 |
| 678,926 | Great Britain | Sept. 10, 1952 |

OTHER REFERENCES

Beilstein's Handbuch der Organischen Chemie, 1918, 4th ed., Band I, pages 498 to 499.

Weygand: Organic Preparations Interscience, N. Y., 1945; pp. 341, 342.

Johnson Acetylenic Compounds, vol. I, Arnold, London, 1946; p. 13.

Vallani et al.: J. A. C. S., vol. 69, pp. 2605–2607 (1947).

Wender et al.: Bureau of Mines Report of Investigations, R. I. 4270, June 1948, pp. 4, 5, 8 to 10 and 25.

Groggins: Unit Processes in Organic Synthesis, McGraw-Hill, N. Y., 1952; pages 577–578.

Astle et al.: Ind. and Eng. Chem., vol. 44 (Sec. 1952), pp. 2869–2871. Bartlett Gilman: Organic Chemistry, vol. III, 1953, Wiley & Sons, N. Y., pp. 102, 103